United States Patent [19]
Ogasawara

[11] Patent Number: 6,141,304
[45] Date of Patent: Oct. 31, 2000

[54] OPTICAL PICKUP

[75] Inventor: Masakazu Ogasawara, Saitama, Japan

[73] Assignee: Pioneer Electronic Corporation, Tokyo, Japan

[21] Appl. No.: 09/060,162

[22] Filed: Apr. 15, 1998

[30] Foreign Application Priority Data

Apr. 16, 1997 [JP] Japan .................................. 9-114466

[51] Int. Cl.⁷ .................................................. G11B 7/095
[52] U.S. Cl. ..................... 369/44.32; 369/58; 369/112; 369/44.23
[58] Field of Search .................... 369/54, 53, 47, 369/48, 58, 124.01, 124.02, 44.32, 44.27, 44.28, 44.23, 112, 109, 103

[56] References Cited

U.S. PATENT DOCUMENTS 5,859,818  1/1999  Tateishi et al. ...................... 369/44.32
5,914,923  6/1999  Araki et al. .......................... 369/44.32

FOREIGN PATENT DOCUMENTS 10-56731  2/1998  Japan .

*Primary Examiner*—Muhammad Edun
*Attorney, Agent, or Firm*—Sughrue, Mion, Zinn, Macpeak & Seas, PLLC

[57] ABSTRACT

An optical pickup includes a laser light source emitting a laser beam, an objective lens collecting the laser beam, and a wavefront-aberration correcting device provided on an optical axis of the laser beam and adapted to change a refractive index by controlling voltage. During reproduction of an optical disk, the wavefront-aberration correcting device corrects a wavefront aberration occurring due to a tilting of the optical disk, or corrects both the wavefront aberration occurring due to the tilting of the optical disk and a wavefront aberration due to the thickness of a substrate of the optical disk.

8 Claims, 13 Drawing Sheets

F: 225nm ~ 275nm
E: 175nm ~ 225nm
D: 125nm ~ 175nm
C: 75nm ~ 125nm
B: 25nm ~ 75nm
A: -25nm ~ 25nm
G: -75nm ~ -25nm
H: -125nm ~ -75nm
I: -175nm ~ -125nm
J: -225nm ~ -175nm
K: -275nm ~ -225nm

RMS VALUE OF WAVEFRONT ABERRATION

DISK TILT: 1.0 [deg]
LENS NA: 0.6

WAVEFRONT ABERRATION DUE TO DISK TILT

RESIDUAL WAVEFRONT ABERRATION AFTER CORRECTION

OPTICAL PICKUP

BACKGROUND OF THE INVENTION

1. Field of the Invention

The present invention relates to an optical pickup for reading recorded information from an optical disk, and more particularly to an optical pickup of a compatible type which can be used for two types of optical disks having different thicknesses up to their recording surfaces, such as a digital video disk (DVD) and a compact disk (CD).

2. Detailed Description of the Related Art

The DVD is an optical disk capable of large volumes of digital information, and allows digital information, such as moving pictures, computer information and the like, to be recorded on a disk having the same 12 cm diameter as the CD with a recording density approximately eight times or more as large as that of the CD. In the DVD, various devices have been made to attain such a high-density recording.

Namely, to increase the storage capacity, the wavelength of a laser light source used is set at 650 nm which is shorter than 780 nm for the CD, and the numerical aperture NA of an objective lens is set at 0.6 which is larger than 0.45 for the CD, thereby attaining high-density recording of about 5 G bytes on one surface of the disk.

As described above, since the DVD allows higher-density recording than the CD, it is necessary to make the spot diameter of a laser beam for reading pit information much smaller than that in the case of the CD. The spot diameter of the laser beam is proportional to the wavelength $\lambda$ of the laser used, and is inversely proportional to the numerical aperture NA of the objective lens. In the DVD, the spot diameter is made small by using a laser light source having a short wavelength and an objective lens having a large numerical aperture NA.

However, in case that the wavelength $\lambda$ of the laser is made short for the DVD and the numerical aperture NA of the objective lens is made large, wavefront aberration (mainly coma-aberration) occurs even if the disk is tilted even slightly, and the margin for a so-called tilt angle, i.e., the angle at which the disk surface is tilted from a perpendicular direction to the optical axis of the objective lens of the optical pickup, becomes small.

The DVD and the CD are optical disks of the same form, and it is desirable to allow the CD to be reproduced by a DVD player. In addition, since the substrate of the disk of the CD is thicker than that of the DVD (e.g., 1.2 mm for one side of the CD as compared to 0.6 mm for one side of the DVD), if the CD is reproduced by using a pickup optimally designed for the DVD, wavefront aberration (mainly spherical aberration) occurs due to the difference in the thickness of the substrate, enlarging the spot diameter of the laser beam. Consequently, there arises the problem that if the optical pickup which is optimally designed for the DVD is used as it is, the information of the CD cannot be read.

For this reason, various methods have been conventionally proposed, including a method in which two exclusive-use objective lenses are prepared for respectively reproducing the DVD and the CD, and the lens is changed over depending on the disk, a method in which a correcting lens is inserted in a collimator portion, and in which an aberration due to the disk is corrected, and a method in which a bifocal lens using a hologram is used as the objective lens.

However, with the method in which two objective lenses are used and the method in which the correcting lens is used, there are drawbacks in that the mechanism is complicated, and that it occupies a large space and is therefore unsuitable for making the apparatus compact in size.

In addition, with the method in which the bifocal lens using a hologram is used, there are drawbacks in that the light utilizing ratio is low due to the effect of diffraction and the like, and that since a multi-beam is used, the effect of interference is liable to occur.

Further, if an arrangement is provided so as to allow both the DVD and the CD to be used, it is difficult to simultaneously effect correction with respect to the tilting of the disk (hereafter referred to as the tilt correction), so that it is necessary to provide a tilt correcting means separately.

If the tilt correcting means is provided separately, the optical pickup apparatus becomes large in size, and the cost becomes high.

For this reason, to overcome these drawbacks, an optical pickup of a compatible type for effecting the changeover between the DVD and the CD, and the tilt correction by using a liquid crystal device has been proposed by the present applicant in Japanese Patent Application No. 109795/1996.

This apparatus is arranged such that a liquid crystal device is disposed in the optical path of the optical pickup, voltage is applied to the liquid crystal device in correspondence with the detected tilt angle to impart a phase difference to the passing bundle of rays, thereby correcting the effect of wavefront aberration ascribable to the tilt angle.

However, the conventional liquid crystal device has not been optimized with respect to the wavefront aberration ascribable to the tilt angle, and has been impossible to completely eliminate the wavefront aberration. Hence, the effect of the wavefront aberration has remained, and it has been impossible to obtain favorable reproducing characteristics.

SUMMARY OF THE INVENTION

The present invention has been devised in view of the above-described problems, and its object is to provide an optical pickup which is capable of reliably correcting the effect of the wavefront aberration ascribable to the tilt angle.

In accordance with the present invention, there is provided an optical pickup including, a laser light source emitting a laser beam, an objective lens collecting the laser beam; and a wavefront-aberration correcting device provided on an optical axis of the laser beam and adapted to change a refractive index by controlling voltage. The wavefront-aberration correcting device has an electrode, and the electrode is divided into a configuration corresponding to a distribution of wavefront aberration ascribable to a tilt angle of an optical disk.

In the above structure, the electrode provided in the wavefront-aberration correcting device is divided into a configuration corresponding to the distribution of wavefront aberration ascribable to the tilt angle of the optical disk. Accordingly, even if the optical disk is tilted during the reproduction of the optical disk, the wavefront-aberration correcting device corrects the light spot formed on the recording surface of the optical disk in such a manner as to suppress the value of wavefront aberration ascribable to the tilt of the optical disk within a predetermined range, so that reproduction can be effected satisfactorily.

Further, in accordance with the present invention, there is provided an optical pickup including, a laser light source emitting a laser beam, an objective lens collecting the laser beam, and a wavefront-aberration correcting device provided on an optical axis of the laser beam and adapted to change a refractive index by controlling voltage. The wavefront-aberration correcting device has a pair of electrodes, one of the electrodes is a first electrode divided into a configuration corresponding to a distribution of wavefront aberration ascribable to a tilt angle of an optical disk, and the other of the electrodes is a second electrode divided into a configuration for correcting wavefront aberration ascribable to the thickness of a substrate of said optical disk to be reproduced.

In the above structure, one of a pair of electrodes of the wavefront-aberration correcting device is divided into a configuration corresponding to the distribution of wavefront aberration ascribable to the tilt angle of the optical disk, and the other one of the pair of electrodes is divided into a configuration for correcting wavefront aberration ascribable to the thickness of the substrate of the optical disk to be reproduced. Accordingly, the wavefront-aberration correcting device corrects the light spot formed on the recording surface of the optical disk in such a manner as to suppress the value of wavefront aberration ascribable to the tilt of the optical disk within a predetermined range and the value of wavefront aberration ascribable to the thickness of the substrate of the optical disk to be reproduced within a predetermined range, so that optical disks whose substrates have different thicknesses can be reproduced satisfactorily, respectively.

In addition, in accordance with the present invention, there is provided an optical pickup including, a laser light source emitting a laser beam, an objective lens collecting the laser beam; and a wavefront-aberration correcting device provided on an optical axis of the laser beam and adapted to change a refractive index by controlling voltage, wherein the wavefront-aberration correcting device has an electrode, and the electrode is divided into a configuration corresponding to a distribution of wavefront aberration ascribable to a tilt angle of an optical disk and into a configuration for correcting wavefront aberration ascribable to the thickness of a substrate of said optical disk.

In the above structure, one of a pair of electrodes of the wavefront-aberration correcting device is formed by being divided into a configuration corresponding to the distribution of wavefront aberration ascribable to the tilt angle of the optical disk and into a configuration for correcting wavefront aberration ascribable to the thickness of the substrate of the optical disk to be reproduced. Accordingly, by controlling one electrode the wavefront-aberration correcting device corrects the light spot formed on the recording surface of the optical disk in such a manner as to suppress the value of wavefront aberration ascribable to the tilt of the optical disk within a predetermined range and the value of wavefront aberration ascribable to the thickness of the substrate of the optical disk to be reproduced within a predetermined range, so that optical disks whose substrates have different thicknesses can be reproduced satisfactorily, respectively.

BRIEF DESCRIPTION OF THE DRAWINGS

Similar reference characters denote corresponding features consistently throughout the attached drawings. The preferred embodiments of this invention will be described in detail, with reference to the following figures, wherein:

FIGS. 11A to 11D are diagrams explaining the liquid crystal panel in accordance with a second embodiment of the present invention, in which FIG. 11A is a cross-sectional structural diagram of the liquid crystal panel, FIG. 11B represents an orientation of the liquid crystal, FIG. 11C is a diagram illustrating the divided configurations of a transparent electrode 302c, and FIG. 11D is a diagram illustrating the divided configurations of a transparent electrode 302a;

FIG. 13A is a cross-sectional structural diagram of the liquid crystal panel and FIG. 13B is a diagram illustrating the divided configurations of a transparent electrode;

DETAILED DESCRIPTION OF THE PREFERRED EMBODIMENTS

Figure 1:
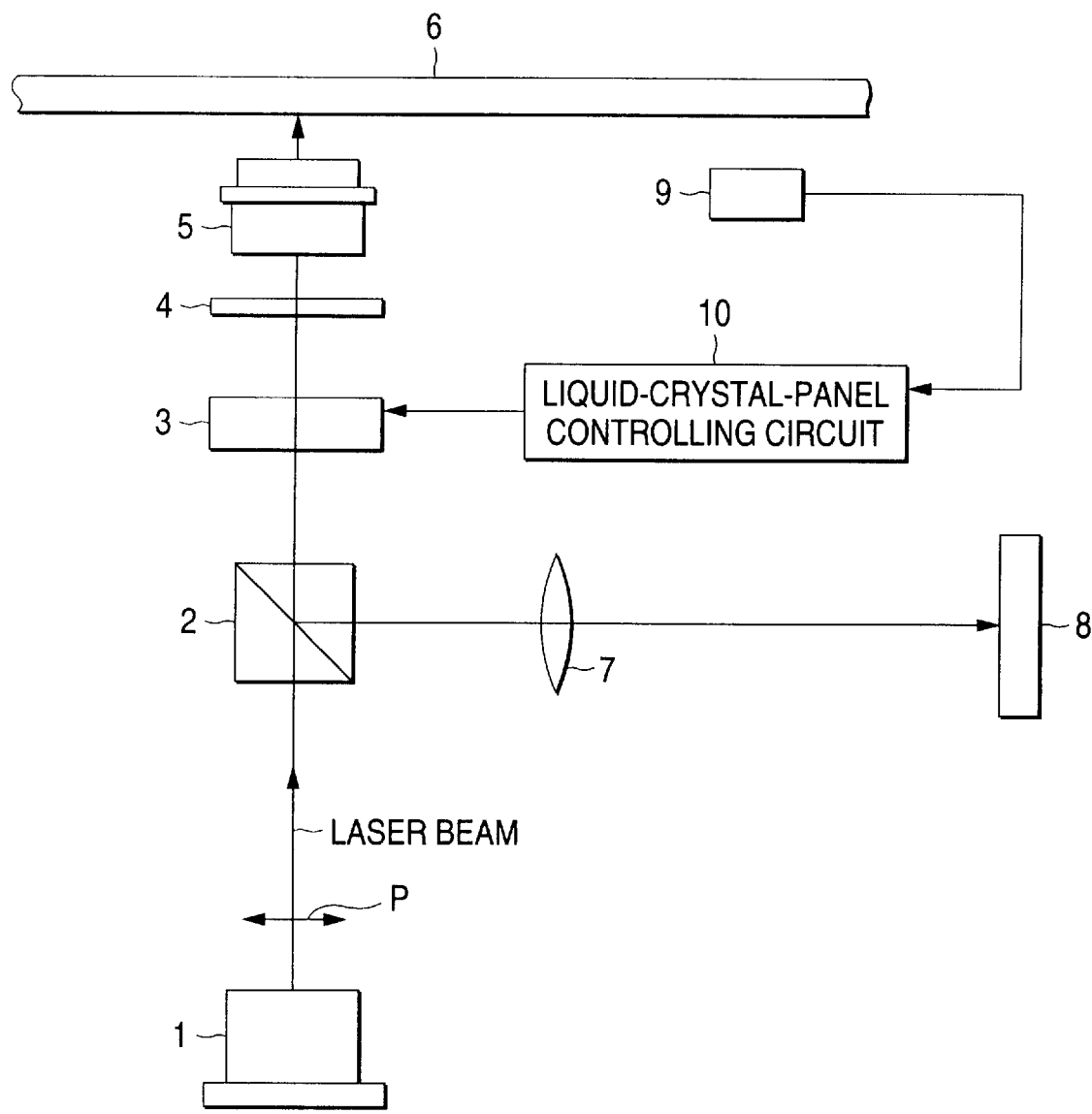
FIG. 1 is a diagram explaining the basic principle of the optical pickup in accordance with a first embodiment of the present invention.

Referring now to the drawings, a description will be given of the embodiments of the present invention.

Liquid Crystal Panel in First Embodiment

FIG. 1 is a diagram explaining the basic principle of the optical pickup in accordance with a first embodiment of the present invention. In FIG. 1, reference numeral 1 denotes a laser light source; 2, a polarization beam splitter; 3, a liquid crystal panel serving as a liquid crystal device; 4, a quarter-wave plate; 5, an objective lens; 6, an optical disk; 7, a condenser lens; 8, a light-receiving device; 9, a tilt sensor for detecting the tilt angle; and 10, a liquid-crystal-panel controlling circuit.

In FIG. 1, the laser beam emitted from the laser light source 1 passes through the polarization beam splitter 2, passes through the liquid crystal panel 3 and the quarter-wave plate 4, is then collected by the objective lens 5, and forms a focal point on an information recording surface of the optical disk 6.

The reflected light of the laser beam reflected by the information recording surface of the optical disk 6 passes again through the objective lens 5 and the liquid crystal panel 3, then has its optical path changed by the polarization beam splitter 2, and forms an image on the light receiving device 8 via the condenser lens 7.

It should be noted that the aforementioned quarter-wave plate 4 is disposed in such a manner as to intersect at an angle of 45° with respect to the plane of polarization P of the laser beam converted to linearly polarized waves by the polarization beam splitter 2.

Figure 2:
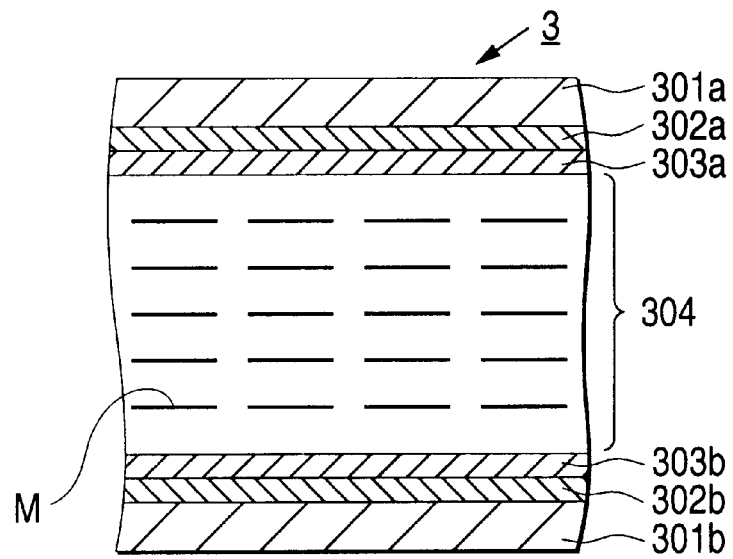
FIG. 2 is a cross-sectional view of an example of the structure of the liquid crystal panel in accordance with the first embodiment.

FIG. 2 shows a cross-sectional view of an example of the structure of the liquid crystal panel in accordance with the first embodiment.

In FIG. 2, numerals 301a and 301b denote transparent glass substrates, and transparent electrodes 302a and 302b formed of indium-tin oxide (ITO) or the like are deposited on inner surfaces of these glass substrates. An electrode pattern having a plurality of divided areas is formed on the transparent electrode 302a, and the divided areas are formed in such a manner that voltage can be applied thereto independently, respectively.

Oriented films 303a and 303b for imparting predetermined molecular orientation to a liquid crystal are respectively formed on inner surfaces of these transparent electrodes 302a and 302b, and a birefringent liquid crystal 304 such as a nematic liquid crystal is sealed in between the oriented films 303a and 303b. In addition, the liquid crystal panel 3 is formed with a range wider than a maximum region of an incident laser beam.

Figure 3:
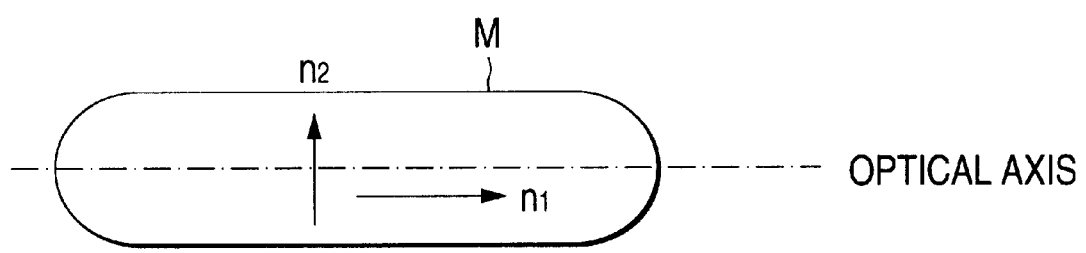
FIG. 3 is a diagram explaining liquid crystal molecules.
Figure 4A:
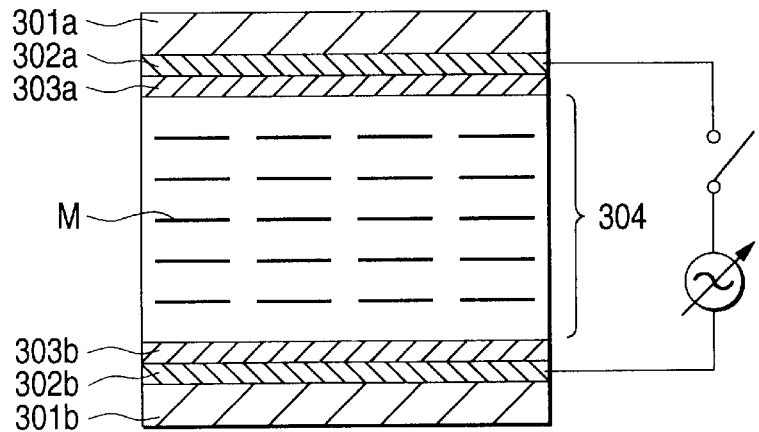
FIGS. 4A to 4C are diagrams explaining the change in refractive index of a liquid crystal due to the difference in applied voltage.
Figure 4B:
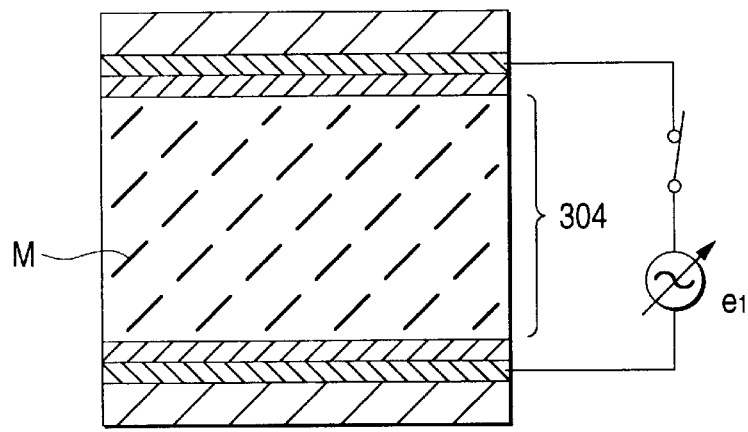
Figure 4C:
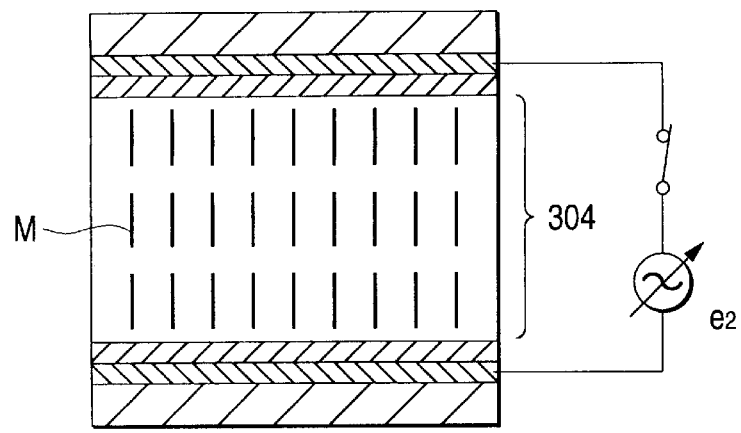

As the liquid crystal 304, one is used which has different refractive indices depending on the direction of the optical axis of a liquid crystal molecule M and a direction perpendicular thereto, as shown in FIG. 3, i.e., a liquid crystal which exhibits a birefringent effect. By changing the voltage applied to the transparent electrodes 302a and 302b, the orientation of the liquid crystal molecule M can be changed freely from the horizontal direction to the perpendicular direction, as shown in FIGS. 4A to 4C.

The liquid-crystal-panel controlling circuit 10 calculates the voltage to be applied to each divided area of the transparent electrode 302a in correspondence with the result of detection by the tilt sensor 9, and outputs the same to the liquid crystal panel 3.

Figure 5A:
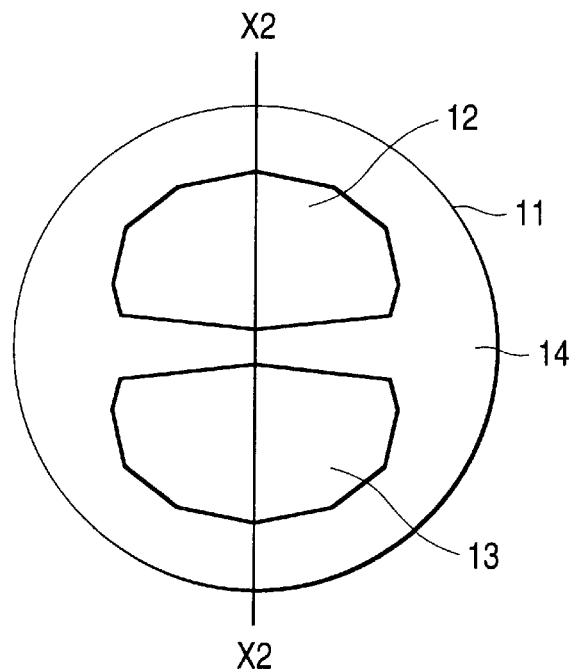
FIGS. 5A and 5B are diagrams illustrating the divided configurations of a transparent electrode.
Figure 5B:
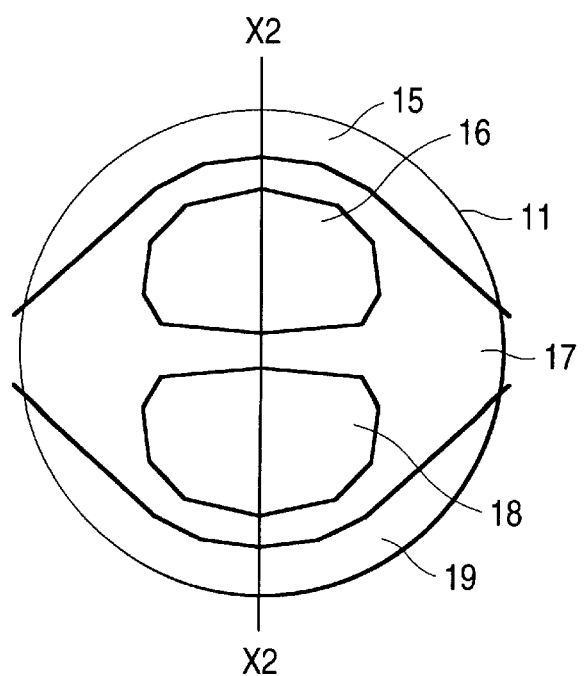

FIGS. 5A and 5B show the divided configurations of the transparent electrode 302a, in which FIG. 5A shows a case in which the transparent electrode 302a is divided into three areas in a maximum region 11 of the laser beam incident upon the liquid crystal panel 3, and FIG. 5B shows a case in which the transparent electrode 302a is divided into five areas in the maximum region 11 of the laser beam incident upon the liquid crystal panel 3.

A description will be given of the basic principle of correction of the wavefront aberration ascribable to the tilt angle of the optical disk in accordance with the present invention.

Here, it is assumed that the wavefront aberration at the pupil plane of the objective lens is assumed to be W(r, φ) where (r, φ) are the polar coordinates of the pupil plane.

In the case where the optical disk has become tilted with respect to the optical axis (in the case where a tilt angle has occurred), the wavefront aberration (mainly coma-aberration) occurs, and it becomes impossible to diaphragm the laser beam by means of the objective lens. In this case, principal components of the wavefront aberration WTLT(r, φ) ascribable to the tilt angle can be expressed by the following formula (1):

$$WTLT(r, \phi) = w_{31} r^3 \cos\phi + w_{11} r \cos\phi \qquad (1)$$

Here, $w_{31}$ and $w_{11}$ are constants which are given by the tilt angle of the optical disk, the thickness of the substrate, the refractive index of the substrate, and NA, and $w_{31}$ represents coma-aberration, while $w_{11}$ represents aberration due to the movement of an image point. The result of calculation of a wavefront aberration distribution in the pupil plane by using this formula corresponds to the wavefront aberration distribution shown in FIG. 6 which will be referred to later.

In addition, if it is assumed that the standard deviation of the wavefront aberration W(r, φ) at the pupil plane is Wrms, Wrms is expressed by Formula (2):

$$Wrms = \sqrt{\frac{\int\int (W(r,\phi) - W_0^2) r\, dr\, d\phi}{\pi}} \qquad (2)$$

Here, $W_0$ in Formula (2) is an average value of W(r, φ) at the pupil plane. Wrms is used for evaluation of the wavefront aberration, and if Wrms is made small, the effect of the wavefront aberration is small, and reproduction can be effected favorably. Here, as can be seen from Formula (2), it suffices to make W(r, φ) small in order to correct the wavefront aberration.

Here, to correct WTLT(r, φ) occurring due to the tilting of the optical disk, the liquid crystal panel 3 is disposed between the laser light source 1 and the objective lens 5, as shown in FIG. 1. Then, if the refractive index of a certain divided area is changed by Δn by controlling the voltage to be applied to each divided area of the liquid crystal panel, an optical path difference Δn·d can be imparted to the laser beam passing through this divided area due to this change in the refractive index. If the optical path difference given by the overall area of the liquid crystal panel is expressed by WLC(r, φ), the wavefront aberration W(r, φ) at the pupil plane of the objective lens when the liquid crystal panel is disposed can be expressed by the following Formula (3):

$$W(r, \phi) = WTLT(r, \phi) + WLC(r, \phi) \qquad (3)$$

As is apparent from Formula (3), to cancel the wavefront aberration W(r, φ) ascribable to the tilt angle of the optical disk, it suffices if an arrangement is provided such that $$W(r, \phi) = WTLT(r, \phi) + WLC(r, \phi) = 0$$

Namely, if the wavefront aberration of polarity opposite to the wavefront aberration W(r, φ) ascribable to the tilt angle of the optical disk is set by means of the liquid crystal panel 3 such that $$WLC(r, \phi) = -WTLT(r, \phi)$$

Figure 6:
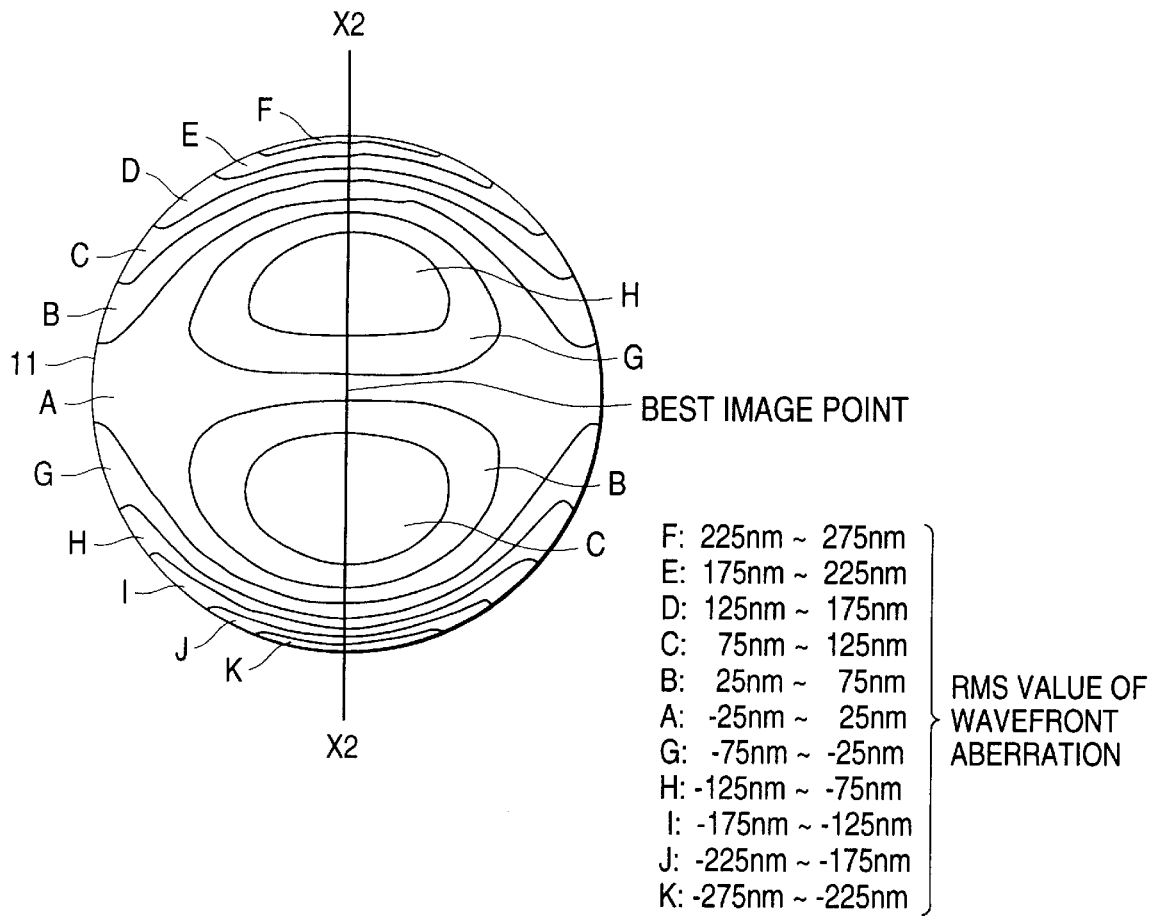
FIG. 6 is a diagram illustrating the distribution of the wavefront aberration in correspondence with the lens diameter of an objective lens used in the convergence of a laser beam.

To impart the wavefront aberration of polarity opposite to the wavefront aberration W(r, φ) ascribable to the tilt angle of the optical disk by means of the liquid crystal panel 3, it suffices if the liquid crystal panel 3 is divided in correspondence with the distribution of the wavefront aberration ascribable to the tilt angle of the optical disk, which is shown in FIG. 6, and if the voltage to be applied to each divided area is controlled in such a manner as to impart wavefront aberration of polarity opposite to the wavefront aberration ascribable to the tilt angle.

Here, if the number of divisions of the liquid crystal panel 3 is increased, the wavefront aberration ascribable to the tilt angle of the optical disk can be canceled completely. However, for instance, the liquid crystal panel 3 is divided into a checkered form, that is, the number of divisions is increased too much, it is necessary to apply a control voltage to each divided area. Hence, the transparent electrodes of the liquid crystal panel 3 must be prepared in correspondence with the respective divided areas, and it is difficult to prepare the transparent electrodes and the wiring of leads.

For this reason, in the present invention, the above-described preparation is readily possible by forming the divided configuration of the liquid crystal panel 3 (the configuration of the divided transparent electrodes) into a divided configuration corresponding to the distribution of the wavefront aberration ascribable to the tilt angle as shown in FIGS. 5A and 5B referred to earlier, and the wavefront aberration ascribable to the tilt angle of the optical disk is corrected efficiently.

FIG. 6 shows the distribution of the wavefront aberration occurring in the pupil plane of the objective lens at this time. Namely, FIG. 6 is a diagram in which the distribution of the wavefront aberration at a best image point of the light spot S' in a case where the recording surface of the disk is tilted +1 is shown within the range of the maximum region 11 of the incident light beam, and is shown by boundary lines of regions A to K which center on the region A whose value of wavefront aberration has a range of −25 nm to +25 nm and which are respectively located above or below the region A at 50 nm intervals.

Figure 7:
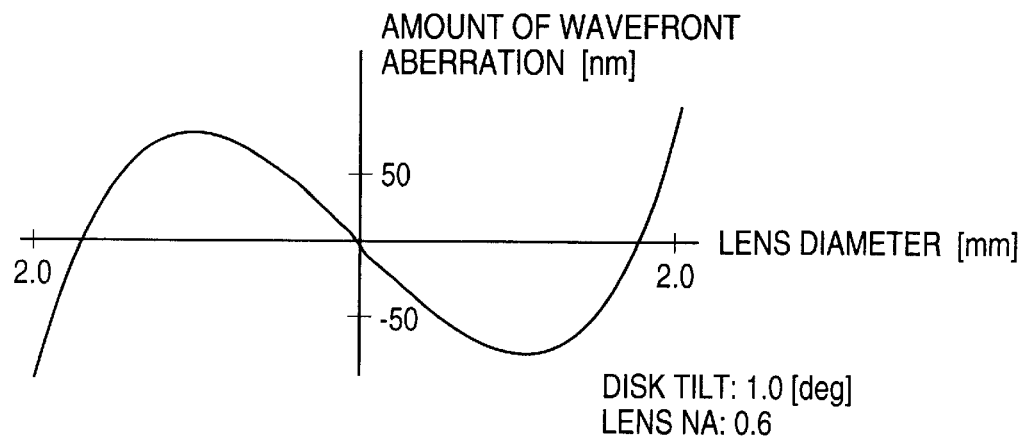
FIG. 7 is a diagram illustrating a distribution characteristic of wavefront aberration.

Line X2—X2 in FIG. 6 is an axis corresponding to the direction in which the optical disk is tilted, and FIG. 7 is a diagram in which this distribution of wavefront aberration is shown by the distribution characteristic on the axis x2—X2.

In addition, the distribution itself of the wavefront aberration exhibits a fixed distribution irrespective of the tilt angle, and the amount of wavefront aberration varies depending on the magnitude of the tilt angle. That is, as for the peak value of the curve shown in FIG. 7, the higher the tilt angle, the higher the peak, and the smaller the tilt angle, the lower the peak.

By taking note of this distribution of the wavefront aberration, if the divided configuration of the transparent electrodes of the liquid crystal panel 3 is formed so as to correspond to the distribution of the wavefront aberration shown in FIG. 6, and a phase difference is imparted to the bundle of rays in such a manner as to cancel the wavefront aberration occurring in each divided area. Then the effect of the wavefront aberration ascribable to the tilt angle can be reduced within a range which does not present a problem in reproduction.

That is, the orientation of liquid crystal molecules is changed by controlling the voltage for each divided area, and the phase difference is imparted to the bundle of rays by changing the refractive index of each divided region, so as to effect the correction of wavefront aberration (mainly coma-aberration) of the objective lens occurring at the time when the disk is tilted.

Thus, the configurations of the electrode patterns shown in FIGS. 5A and 5B are set on the basis of the wavefront aberration distribution (shown in FIG. 6) in the case where the recording surface of the optical disk is tilted +1°. In FIG. 5A, an electrode pattern is formed which has a configuration in which the values of wavefront aberration are divided into three parts by areas 12 to 14 obtained by dividing the values of wavefront aberration into three ranges, for instance.

It should be noted that the area 14 is an area formed by including 0 as the value of wavefront aberration, and the areas 12 and 13 have symmetrical configurations and are areas where the values of wavefront aberration imparted to the transmitting light flux are of opposite polarity.

Meanwhile, in FIG. 5B, an electrode pattern is formed so as to have a configuration in which the values of wavefront aberration are divided into five parts by areas 15 to 19. It should be noted that the area 17 is formed by including 0 as the value of wavefront aberration, and the areas 15 and 19 have symmetrical configurations and are areas where the values of wavefront aberration imparted to the transmitting light flux are of opposite polarity.

Further, the areas 16 and 18 have symmetrical configurations and are areas where the values of wavefront aberration imparted to the transmitting light flux are of opposite polarity.

Figure 8A:
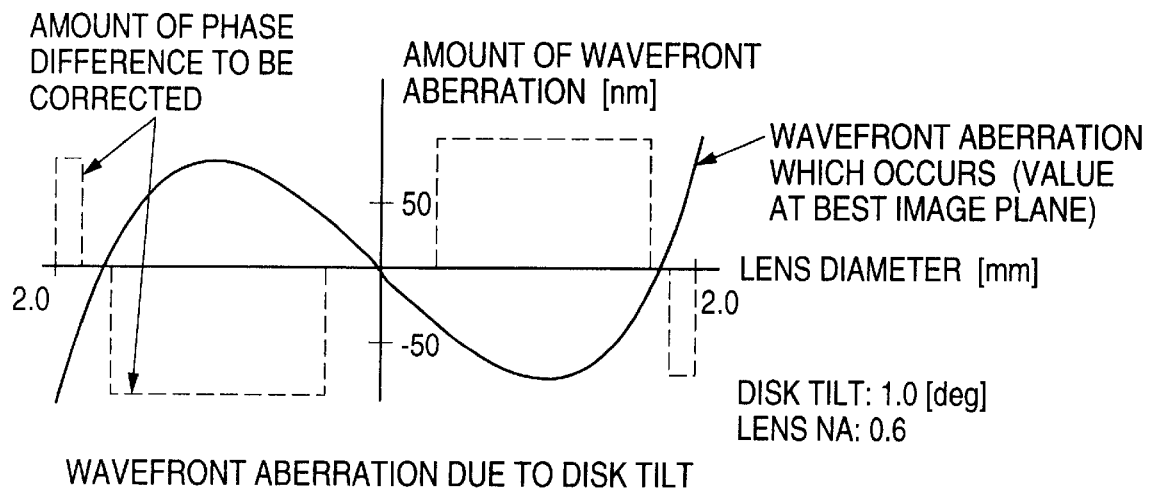
FIG. 8A is a diagram illustrating the wavefront aberration occurring in the case where the optical disk is tilted.
Figure 8B:
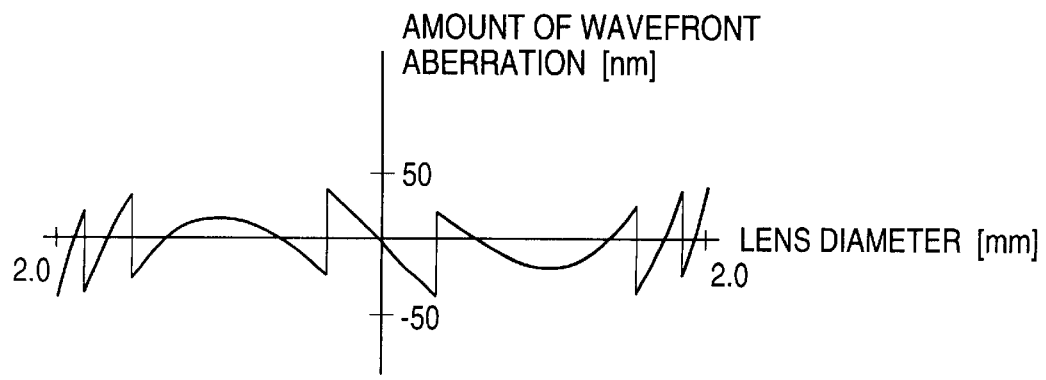
FIG. 8B is a diagram illustrating the distribution of residual wavefront aberration after correction of phase difference.
Figure 9:
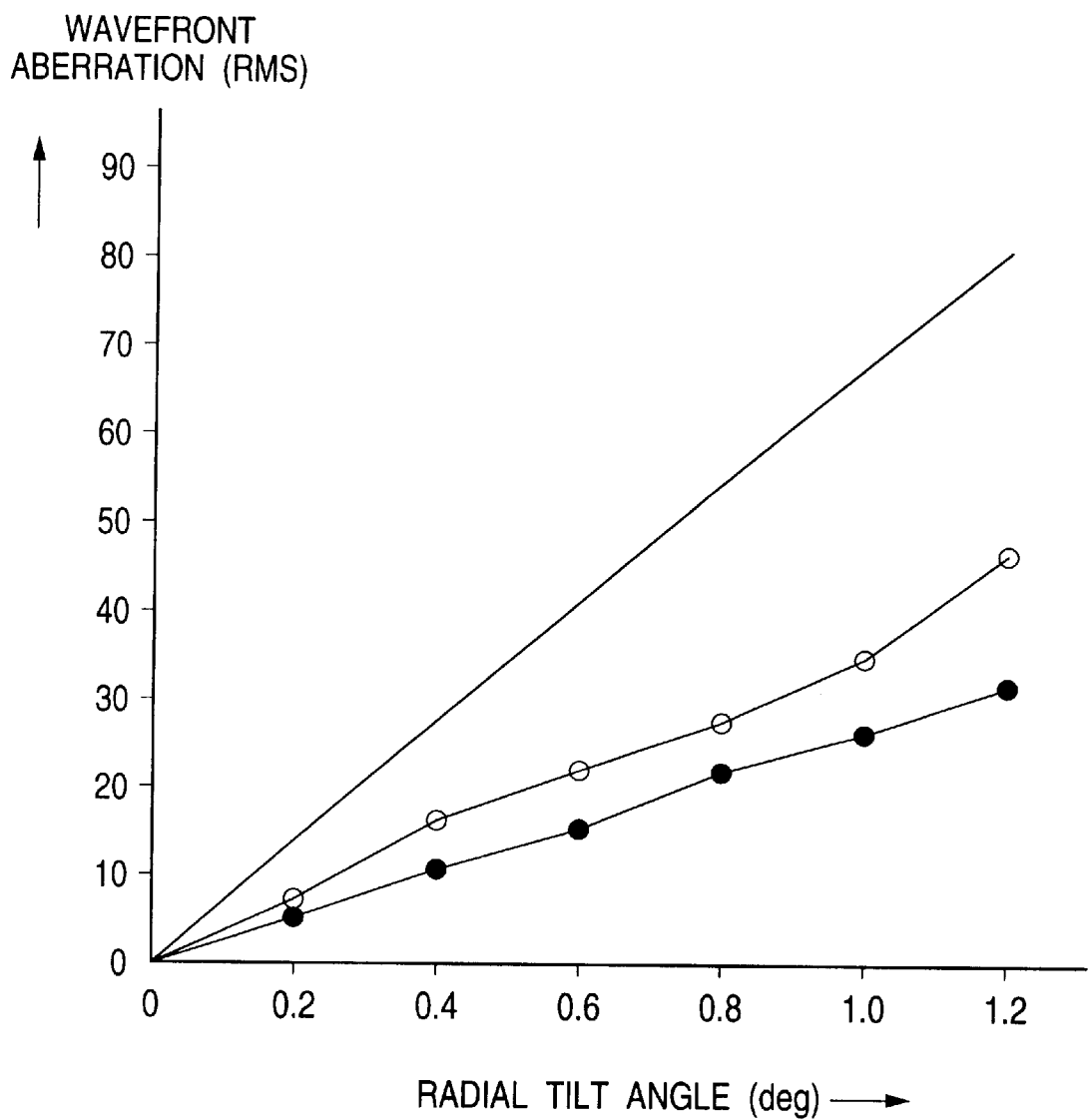
FIG. 9 is a graphic showing the simulated results of the wavefront aberration of a light spot, which is formed on the recording surface of the optical disk by the optical pickup in accordance with the first embodiment of the present invention, for each tilt angle (in the radial direction) of the disk.
Figure 10A:
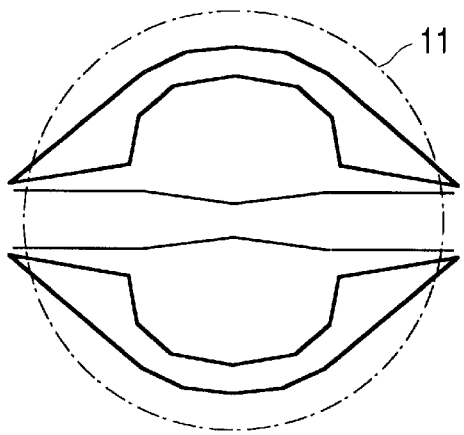
FIGS. 10A to 10F are diagrams which illustrate other examples of electrode patterns divided by transparent electrodes of the liquid crystal panel.
Figure 10D:
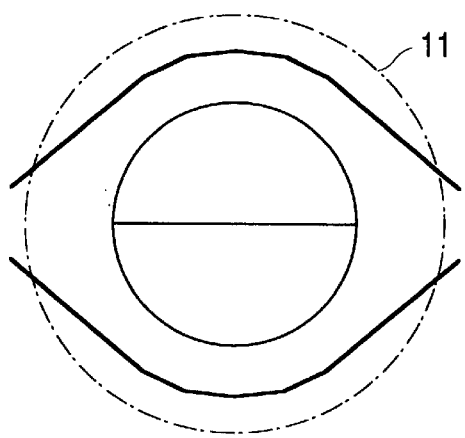
Figure 10B:
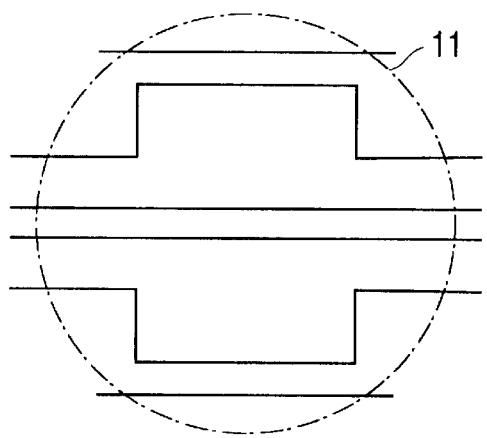
Figure 10E:
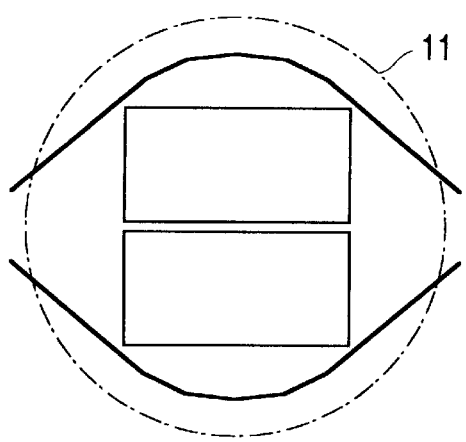
Figure 10C:
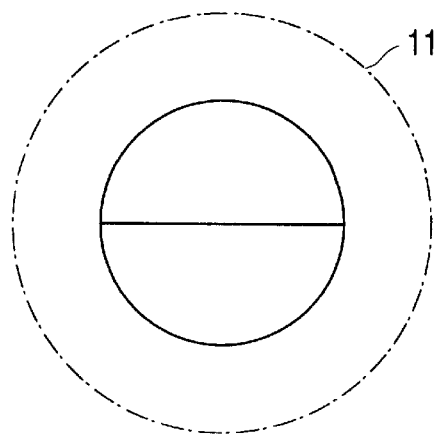
Figure 10F:
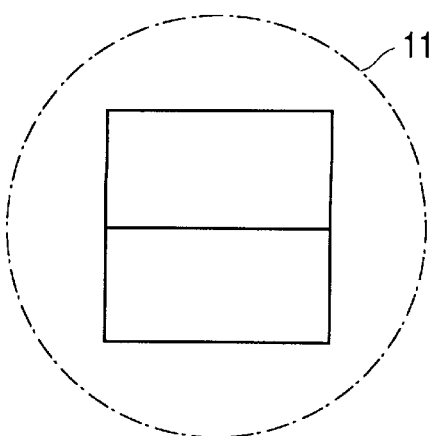

Next, referring to FIGS. 8A, 8B, and 9, a description will be given of the operation of the liquid-crystal-panel controlling circuit 10 and the effect of correction based on the above-described basic principle in the case where the optical disk 6 is tilted 1° in the radial direction. FIG. 8A is a diagram illustrating the wavefront aberration occurring in the case where the optical disk is tilted and FIG. 8B is a diagram illustrating the distribution of residual wavefront aberration after correction of the wavefront aberration. FIG. 9 is a graphic showing the simulated results of the wavefront aberration of a light spot, which is formed on the recording surface of the optical disk by the optical pickup in accordance with the first embodiment of the present invention, for each tilt angle (in the radial direction) of the disk. It should be noted that a description will be given herein of a case where correction is effected by using the pattern in which the transparent electrode 302a of the liquid crystal panel 3 is divided into five areas as shown in FIG. 5B. In addition, to correct the wavefront aberration ascribable to the tilt angle in the radial direction of the optical disk, the liquid crystal panel 3 is disposed such that the axis X2—X2 in FIG. 5B is aligned in the radial direction of the optical disk.

The liquid-crystal-panel controlling circuit 10 provides control so as to apply a predetermined control voltage to the electrode corresponding to the area 17 in FIG. 5B so that the phase difference of the light beam transmitted therethrough becomes 0, and to apply a control voltage to the other electrodes corresponding to the areas 15, 16, 18, and 19 to correct the amount of phase difference shown by the dotted line in FIG. 8A. Specifically, the following voltages are applied from the liquid-crystal-panel controlling circuit 10 to the respective areas: a voltage for imparting a phase difference of −75 nm to the area 15, a voltage for imparting a phase difference of +75 nm to the area 16, a voltage for imparting a phase difference of −75 nm to the area 18, and a voltage for imparting a phase difference of +75 nm to the area 19.

Wavefront aberration (phase difference) of polarity opposite to the wavefront aberration ascribable to the tilt angle is imparted by the objective lens to the light flux transmitted through the liquid crystal panel 3 to which the aforementioned voltages have been applied. For this reason, the wavefront aberration occurring in the light spot on the recording surface of the tilted disk is canceled, whereby the wavefront aberration ascribable to the tilt angle is corrected.

FIG. 8B is a diagram illustrating the state of residual wavefront aberration after correction in the case where the electrodes of the five-divided pattern shown in FIG. 5B are used. It can be seen that the residual wavefront aberration has become much smaller than the amount of wavefront aberration ascribable to the tilt angle before correction in FIG. 8A.

It should be noted that, as shown in FIG. 8A, in the area 19 relative to the area 15 and in the area 18 relative to the area 16, since the amounts of phase difference to be corrected are equal in magnitude, the control voltage applied thereto is equal in magnitude but opposite in polarity relative to each other. Accordingly, if its polarity is not taken into consideration, only two kinds of voltage may be used as the voltage for controlling the amount of phase difference for the liquid crystal panel as a whole.

In addition, in the case where the voltage applied to the electrode corresponding to the area 17 is 0, the liquid crystal molecules only have to be oriented in advance such that the phase difference of the light beam passing through the area 17 becomes 0. In this case, only one kind of voltage may be used as the voltage for controlling the amount of phase difference for the liquid crystal panel as a whole, if its polarity is not taken into consideration.

Further, in the case where the transparent electrode 302a making up a part of the liquid crystal panel 3 of the optical pickup is formed with the three-divided pattern shown in FIG. 5A, control is provided in such a manner that the same voltage as that of the areas 16 and 18 of the five-divided pattern in FIG. 5B is applied to the areas 12 and 13, respectively, of the three-divided electrode in FIG. 5A, and a phase difference is not imparted to the transmitting light flux in the area 14.

Incidentally, in the case of the three-divided pattern shown in FIG. 5A, the liquid-crystal-panel controlling circuit 10 can be controlled so as to apply such a predetermined control voltage to the electrode corresponding to the area 14 that the phase difference of the light beam transmitted therethrough becomes 0, and to apply a control voltage equal in magnitude but opposite in polarity to the electrodes corresponding to the other areas 12 and 13. Hence, only two kinds of voltage may be used as the voltage for controlling the amount of phase difference for the liquid crystal panel as a whole if its polarity is not taken into consideration.

In addition, in the case where the voltage applied to the electrode corresponding to the area 14 is 0, the liquid crystal molecules only have to be oriented in advance so that the phase difference of the light beam passing through the area 14 becomes 0. In this case, only one kind of voltage may be used as the voltage for controlling the amount of phase difference for the liquid crystal panel as a whole if its polarity is not taken into consideration.

FIG. 9 shows the relationship between, on the one hand, the wavefront aberration of a light spot formed on the recording surface of the optical disk 6 by the optical pickup arranged as described and, on the other hand, the tilt angle (in the radial direction) of the optical disk.

In FIG. 9, the solid line shows the result of simulation of the wavefront aberration in a case where correction is not effected, the line with unfilled circles shows the result of simulation of the wavefront aberration in a case where correction is effected by using the three-divided electrodes as the transparent electrode 302a, and the line with filled circles shows the result of simulation of the wavefront aberration in a case where correction is effected by using the five-divided electrodes.

As can be appreciated from the diagram, in both cases where the three-divided electrodes and the five-divided electrodes are used as the transparent electrode 302a, the wavefront aberration decreases with respect to the inclination of the disk (in the radial direction). Further, it can be seen that a greater effect of correction is obtained if the number of divisions is increased.

It should be noted that although, in the case of FIG. 1, the tilt sensor 9 is adapted to detect the tilt of the optical disk 6, the present invention is not limited to the same, and if the tilt sensor 9 is disposed so as to detect the tilt in the tangential direction (in the circumferential direction), correction of the tilt in the tangential direction (in the circumferential direction) can be effected in a similar manner. In that case, however, the divided pattern of the transparent electrode 302a shown in FIG. 5 is arranged in such a manner that the axis X2—X2 is aligned in the tangential direction (in the circumferential direction).

Incidentally, although the transparent electrode 302a is formed by a three- or five-divided electrode pattern as described above, and the transparent electrode 302b is formed by a circular electrode pattern and an electrode pattern adjacent to an outer peripheral portion thereof, the electrode patterns of the respective transparent electrodes are not limited to the same.

Namely, the divided configuration of the transparent electrode 302a has only to be set on the basis of the distribution of the wavefront aberration ascribable to the tilt angle of the optical disk at the pupil plane of the objective lens.

Patterns of other divided configurations of the transparent electrode 302a are shown in FIGS. 10A to 10F.

The divided configurations shown in FIGS. 10A to 10F also can be reduced within a range which the effect of wavefront aberration ascribable to the tilt angle does not present a problem in reproduction.

By using the liquid crystal panel in accordance with the first embodiment of the present invention, even if the optical disk is tilted, the light spot formed on the recording surface of the optical disk is capable of suppressing the value of wavefront aberration ascribable to the tilting of the optical disk within a predetermined range. Hence, the information recorded on the optical disk can be read satisfactorily.

Liquid Crystal Panel in Second Embodiment

Next, referring to FIGS. 11A to 11D, a description will be given of an example of the liquid crystal panel in accordance with a second embodiment.

The optical pickup in accordance with the second embodiment of the present invention is arranged by using a liquid crystal panel 20 instead of the liquid crystal panel 3 in the optical pickup shown in FIG. 1.

Figure 11A:
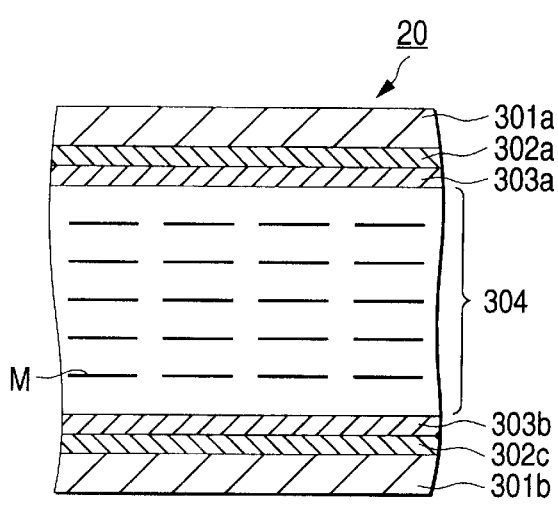

FIGS. 11A to 11D shows an example of the structure of the liquid crystal panel 20. FIG. 11A is a cross-sectional structural diagram of the liquid crystal panel 20, in which portions equivalent to those of the liquid crystal panel 3 shown in FIG. 2 referred to earlier are denoted by the same reference numerals, and a description thereof will be omitted.

Figure 11C:
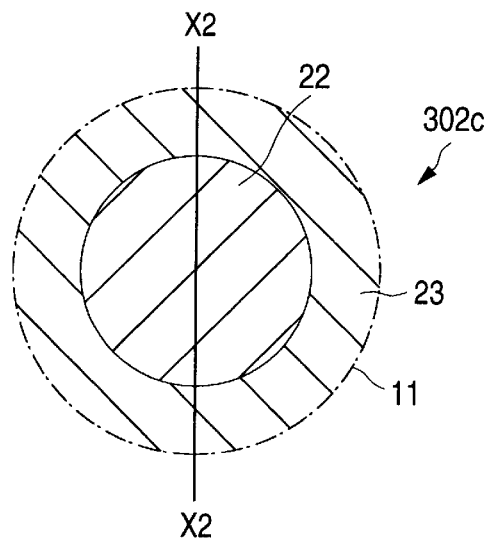
Figure 11B:
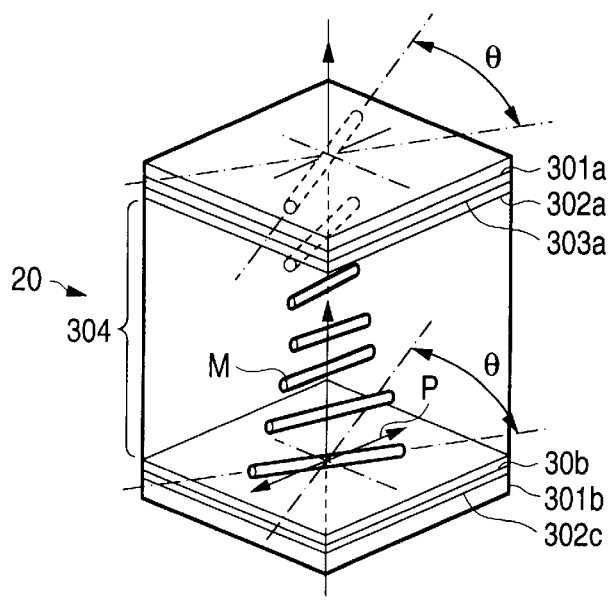
Figure 11D:
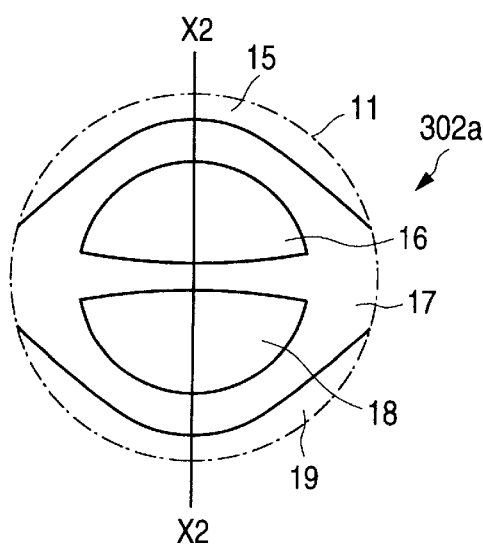

It should be noted that the transparent electrode 302a used in the liquid crystal panel 20 applies voltage to the liquid crystal to correct the wavefront aberration ascribable to the tilt angle, and it is assumed herein that the transparent electrode 302a is formed in five-divided form, as shown in FIG. 11D. In addition, to correct the wavefront aberration ascribable to the tilt angle of the optical disk in the radial direction, the liquid crystal panel 20 is disposed such that the axis X2—X2 is aligned in the radial direction of the optical disk.

In addition, reference numeral 302c in FIG. 11A denotes a transparent electrode which is formed of indium-tin oxide (ITO) or the like and deposited on an inner surface of the glass substrate 301b, and forms an electrode pair with the transparent electrode 302a.

The transparent electrode 302c is an electrode for correcting the spherical aberration occurring due to the difference in thickness of the substrates of two different kinds of optical disks. As shown in: FIG. 11C, in the maximum region 11 of the incident laser beam, the transparent electrode 302c is divided into configurations corresponding to two areas shown by a circular aperture area 22 (the hatched portion) restricted to a central portion and by an area 23 (the hatched portion) adjacent to an outer peripheral portion of the area 22.

As shown in FIG. 11B, the liquid crystal 304 used in the liquid crystal panel 20 is formed between the transparent electrodes 302a and 302c in a state of being twist-oriented at a predetermined angle θ.

Next, a description will be given of the control operation effected by the liquid-crystal-panel controlling circuit 10 in the case where information recorded on optical disks having different thicknesses up to their recording surfaces is respectively read, by citing by way of example the case in which information recorded on a DVD and a CD is read.

First, in the case where the optical pickup reads information recorded on the DVD, a DVD selection signal is imparted to the liquid-crystal-panel controlling circuit 10. When this DVD selection signal is imparted, the liquid-crystal-panel controlling circuit 10 applies voltage to the respective electrodes corresponding to the areas 22 and 23 provided in the transparent electrode 302c of the liquid crystal panel 20, and thereby effects control such that all the liquid crystal molecules of the liquid crystal 304 are set in a substantially perpendicularly oriented state by the electric field. Consequently, the overall area of the liquid crystal panel 20 acts as a mere transparent plate, and the polarizing action due to twist practically disappears.

As a result, the laser beam, which is constituted by linearly polarized light made incident upon the liquid crystal panel 20 after passing through the polarization beam splitter 2, reaches the quarter-wave plate 4 as it is without rotating in the plane of polarization.

As for the linearly polarized laser beam incident upon the quarter-wave plate 4, since its plane of polarization P intersects the crystal axis of the quarter-wave plate 4 at an angle of 45°, the laser beam is converted from the linearly polarized light to circularly polarized light. Then, after the laser beam is reflected by the information-recorded surface of the optical disk 6, the laser beam is made incident again upon the quarter-wave plate 4 so as to be converted from the circularly polarized light to the linearly polarized light.

The plane of polarization of this reflected beam returned to the linearly polarized light is one which is rotated 90° from the original plane of linear polarization, and this reflected beam is a polarized wave oriented perpendicular to the plane of polarization of the polarization beam splitter 2.

This reflected beam constituted by linearly polarized light rotated 90° passes as it is through the liquid crystal panel 20 acting as a transparent plate, and reaches the polarization beam splitter 2. As mentioned before, since the plane of polarization of the reflected beam is rotated in a direction perpendicular to the plane of polarization of the polarization beam splitter 2, the reflected beam is reflected in the horizontal direction by the plane of polarization of the polarization beam splitter 2, and is received by the light receiving device 8 via the condenser lens 7.

Thus, since the overall area of the liquid crystal panel 20 acts as a mere transparent plate during the reading of the information recorded on the DVD, all the reflected light from the disk can be transmitted to the light receiving device 8. For this reason, when the information recorded on the DVD is read, the entire area of the objective lens 5 is used.

Accordingly, if the numerical aperture of the objective lens 5 at this time is set such that NA=0.6 (in the case where the wavelength of the laser is 650 nm), the DVD can be reproduced properly.

In addition, since, at the same time as the above-described control operation, the liquid-crystal-panel controlling circuit 10 effects the tilt correction of the DVD by controlling the transparent electrode 302a in the same way as in the first embodiment, even if the DVD is tilted, the light spot formed on the recording surface of the optical disk can be suppressed within a predetermined range in terms of the value of wavefront aberration ascribable to the tilt of the DVD. At the same time, it is possible to obtain sufficient reflected light intensity sufficient for reading the recorded information.

Figure 12A:
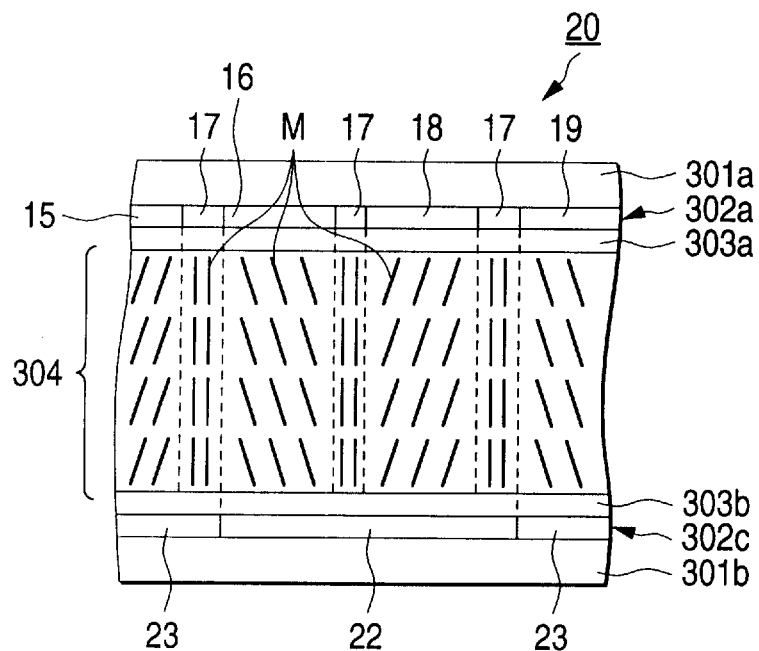
FIGS. 12A and 12B are cross-sectional views illustrating the states of orientation of the liquid crystal molecules in the liquid crystal panel controlled by the liquid-crystal-panel controlling circuit of the optical pickup in accordance with the second embodiment.
Figure 12B:
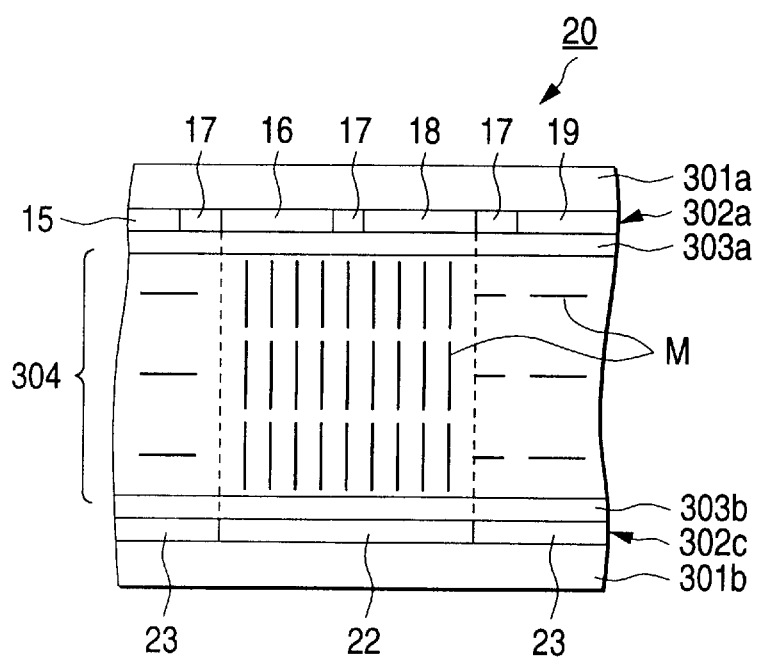

FIGS. 12A and 12B are cross-sectional views in which the states of orientation of the liquid crystal molecules M in the liquid crystal 304 corresponding to the respective areas are shown along the axis X2—X2 in a case where the liquid-crystal-panel controlling circuit 10 of the optical pickup in accordance with the second embodiment controls the voltage for each area of the divided electrode of the liquid crystal panel 20. Specifically, FIG. 12A is a diagram illustrating a case in which the optical pickup reads the recorded information of the DVD, while FIG. 12B is a diagram illustrating a case in which the optical pickup reads the recorded information of the CD.

When the optical pickup reads the recorded information of the DVD, as shown in FIG. 12A, the liquid-crystal-panel controlling circuit 10 controls the voltage to be applied to each area of the transparent electrode 302a after temporarily orienting the liquid crystal molecules M in a perpendicular direction (oriented in the vertical direction in the drawing), so that the orientation of the liquid crystal molecules M is controlled for each area in correspondence with the tilt of the DVD.

On the other hand, when the optical pickup reads the recorded information of the CD, as shown in FIG. 12B, the liquid-crystal-panel controlling circuit 10 perpendicularly orients the liquid crystal molecules M corresponding to the area 22, and twist-orients the liquid crystal molecules M corresponding to the area 23.

Next, when the optical pickup reads the recorded information of the CD, a CD selection signal is imparted to the liquid-crystal-panel controlling circuit 10. When this CD selection signal is imparted, the liquid-crystal-panel controlling circuit 10 applies voltage to the electrode corresponding to the area 22 provided in the transparent electrode 302c of the liquid crystal panel 20, and effects control such that the liquid crystal molecules M of the liquid crystal 304 corresponding to the area 22 assume a substantially perpendicularly oriented state by its electric field. Then, the portion of the liquid crystal panel at the area 22 becomes a mere transparent plate due to the action similar to the one described before.

Accordingly, in the same way as in the case of the above-described reproduction of the DVD, all the reflected light passing through this area 22 is reflected in the horizontal direction by the polarization beam splitter 2, and is received by the light receiving device 8.

In addition, at the same time as the above-described control operation of the area 22, the liquid-crystal-panel controlling circuit 10 effects control such that the voltage applied to the area 23 becomes 0 (ground potential), so that no electric field acts on the liquid crystal molecules M of the liquid crystal 304 corresponding to the area 23.

Accordingly, the liquid crystal molecules M of the liquid crystal 304 corresponding to the area 23 remain in the twist-oriented state. Hence, the reflected light passing through the area 23 has its plane of polarization rotated along the twisted liquid crystal molecules M, and is made incident upon the quarter-wave plate 4.

As for the laser beam incident upon the quarter-wave plate 4, since its plane of polarization is oriented in a substantially similar direction as that of the crystal axis of the quarter-wave plate 4, that laser beam passes through the quarter-wave plate 4 without being substantially affected by the effect of the quarter-wave plate 4, and after it is reflected by the information recording surface of the CD, that laser beam is made incident upon the quarter-wave plate 4.

The reflected light incident upon the quarter-wave plate 4 passes again through the quarter-wave plate 4 as it is in the form of the linearly polarized light without being substantially affected by the effect of the quarter-wave plate 4, and is made incident upon the liquid crystal panel 20. This reflected light constituted by the linearly polarized light, when passing through the liquid crystal panel 20, has its plane of polarization rotated along the twist of the liquid crystal molecules M. When this reflected light emerges from the liquid crystal panel 20, its direction of polarization becomes substantially similar to that of the original plane of polarization of the laser beam.

Accordingly, since the laser beam reflected by the CD after passing through the area 23 of the liquid crystal panel 20 is transmitted as it is through the polarization beam splitter 2, that laser beam is not made incident upon the light receiving device 8.

Thus, when the recorded information of the CD is read, only the area 22 of the transparent electrode 302c of the liquid crystal panel 20 is made to act as the transparent plate, only the reflected light which passed through this circular pattern portion can be transmitted to the light receiving device 8.

This is equivalent to the fact that, of the laser beam passing through the objective lens 5, the portion of the laser beam passing through the outer peripheral portion of the lens where the aberration is large is cut off. Accordingly, if the configuration of the area 22 is set such that the numerical aperture NA at this time is equivalently set to a value suitable for the reading of the recorded information of the CD, e.g., NA=0.37 (in the case where the wavelength of the laser is 650 nm), then the recorded information of the CD can be read properly by using the same optical pickup used for the DVD.

As the transparent electrode 302c, it suffices if its configuration is set such that the portion of the laser beam passing through the outer peripheral portion of the lens can be cut off by narrowing the range of the laser beam passing through the objective lens 5 in correspondence with the optical disk to be reproduced. The divided configuration of the transparent electrode 302c may be set in correspondence with the kinds of optical disks to be reproduced.

As described above, in the second embodiment, the transparent electrode 302c of the liquid crystal panel 20 is formed in a divided pattern for changeover between the DVD and the CD, and the transparent electrode 302a is formed in a divided pattern for tilt correction. Therefore, the liquid-crystal-panel controlling circuit 10 can provide control easily since it is capable of effecting tilt correction and changeover between the DVD and the CD by appropriately controlling the changeover of the electrode patterns of the liquid crystal panel 20.

Liquid Crystal Panel in Third Embodiment

Figure 13A:
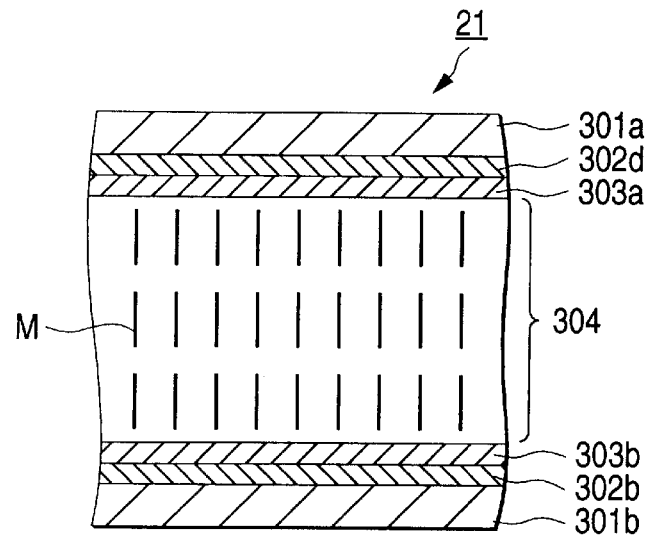
FIGS. 13A and 13B are diagrams explaining the liquid crystal panel in accordance with a third embodiment of the present invention.
Figure 13B:
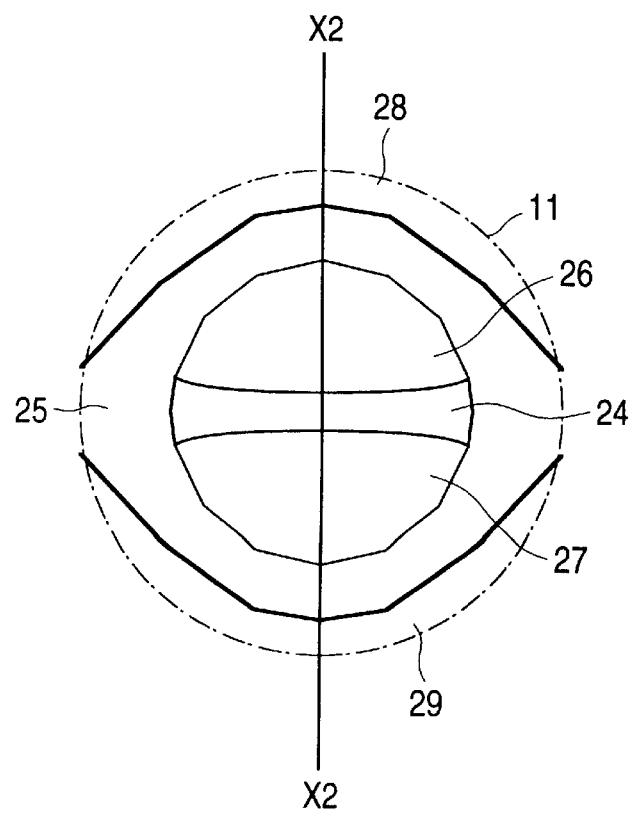

FIGS. 13A and 13B are diagrams illustrating an example of the structure of the liquid crystal panel in accordance with a third embodiment. FIG. 13A is a cross-sectional structural diagram of a liquid crystal panel 21, in which portions equivalent to those of the liquid crystal panel 3 shown in FIG. 2 referred to earlier are denoted by the same reference numerals, and a description thereof will be omitted.

It should be noted that the liquid crystal 304 used in the liquid crystal panel 21 is formed between the transparent electrodes 302b and 302d in a twist-oriented state at a predetermined angle θ in the same way as the liquid crystal panel 20 used in the above-described second embodiment.

In addition, reference numeral 302d in FIG. 13A denotes a transparent electrode which is formed of ITO or the like and deposited on an inner surface of the glass substrate 301a. FIG. 13B is a diagram illustrating the layout of patterns of electrodes provided in the transparent electrode 302d. This transparent electrode 302d integrates an electrode dividing pattern for correcting the wavefront aberration ascribable to the tilt angle and an electrode dividing pattern for correcting the spherical aberration occurring due to the difference in thickness of the substrates of two different kinds of optical disks.

In the maximum region 11 of the incident laser beam, to correct the wavefront aberration ascribable to the tilt angle of the optical disk in the radial direction, the liquid crystal panel 21 is arranged such that the axis X2—X2 is aligned with the radial direction of the optical disk, and the transparent electrode 302d is formed by an electrode pattern divided into six areas 24 to 29 which are arranged substantially symmetrical about the axis X2—X2, as shown in FIG. 13B.

Next, a description will be given of the control operation effected by the liquid-crystal-panel controlling circuit 10 in the case where optical disks having different thicknesses up to their recording surfaces are respectively reproduced, by citing by way of example the case in which information recorded on the DVD and the CD is read.

First, in the case where information recorded on the DVD is read, a DVD selection signal is imparted to the liquid-crystal-panel controlling circuit 10. When this DVD selection signal is imparted, the liquid-crystal-panel controlling circuit 10 applies a predetermined voltage uniformly to the respective electrodes corresponding to the areas 24 to 29 provided in the transparent electrode 302d of the liquid crystal panel 21, and thereby effecting control such that all the liquid crystal molecules of the liquid crystal 304 are set in a substantially perpendicularly oriented state by the electric field. Consequently, the overall area of the liquid crystal panel 21 acts as a mere transparent plate, and the polarizing action due to twist practically disappears.

As a result, the laser beam, which is constituted by linearly polarized light made incident upon the liquid crystal panel 21 after passing through the polarization beam splitter 2, reaches the quarter-wave plate 4 as it is without rotating in the plane of polarization.

As for the linearly polarized laser beam incident upon the quarter-wave plate 4, since its plane of polarization P intersects the crystal axis of the quarter-wave plate 4 at an angle of 45°, the laser beam is converted from the linearly polarized light to circularly polarized light. Then, after the laser beam is reflected by the information-recorded surface of the optical disk 6, the laser beam is made incident again upon the quarter-wave plate 4 so as to be converted from the circularly polarized light to the linearly polarized light.

The plane of polarization of this reflected beam returned to the linearly polarized light is one which is rotated 90° from the original plane of linear polarization, and this reflected beam is a polarized wave oriented perpendicular to the plane of polarization of the polarization beam splitter 2.

This reflected beam constituted by linearly polarized light rotated 90° passes as it is through the liquid crystal panel 21 acting as a transparent plate, and reaches the polarization beam splitter 2. As mentioned before, since the plane of polarization of the reflected beam is rotated in a direction perpendicular to the plane of polarization of the polarization beam splitter 2, the reflected beam is reflected in the horizontal direction by the plane of polarization of the polarization beam splitter 2, and is received by the light receiving device 8 via the condenser lens 7.

Thus, since the overall area of the liquid crystal panel 21 acts as a mere transparent plate during the reading of the information recorded on the DVD, all the reflected light from the disk can be transmitted to the light receiving device 8. For this reason, when the information recorded on the DVD is read, the entire area of the objective lens 5 is used.

Accordingly, if the numerical aperture of the objective lens at this time is set such that NA=0.6 (in the case where the wavelength of the laser is 650 nm), the DVD can be reproduced properly.

In addition, in the case where the DVD is tilted in the radial direction while the optical pickup is reading the recorded information of the DVD, the liquid-crystal-panel controlling circuit 10 effects control by changing for each of the areas 24 to 29 the predetermined voltage applied uniformly to each electrode.

Figure 14A:
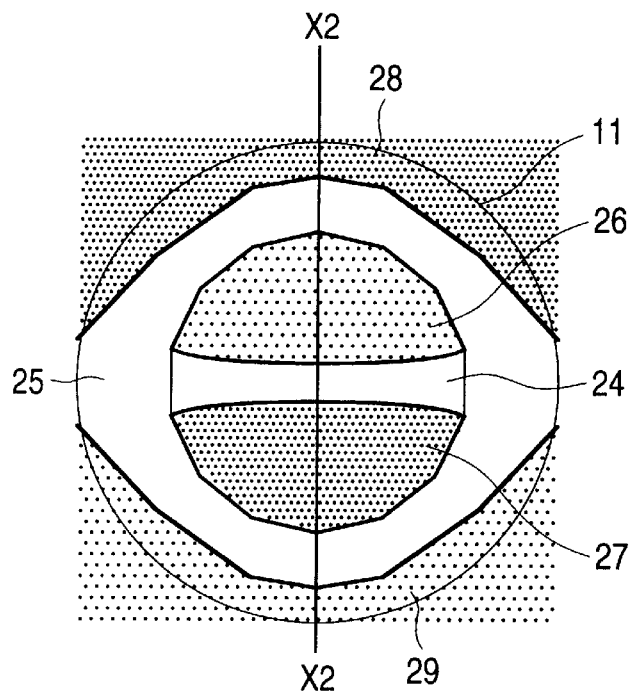
FIGS. 14A and 14B are diagrams illustrating the state of application of voltage to areas of the transparent electrode of the liquid crystal panel for which the voltage is controlled by the liquid-crystal-panel controlling circuit in the optical pickup in accordance with the third embodiment.
Figure 14B:
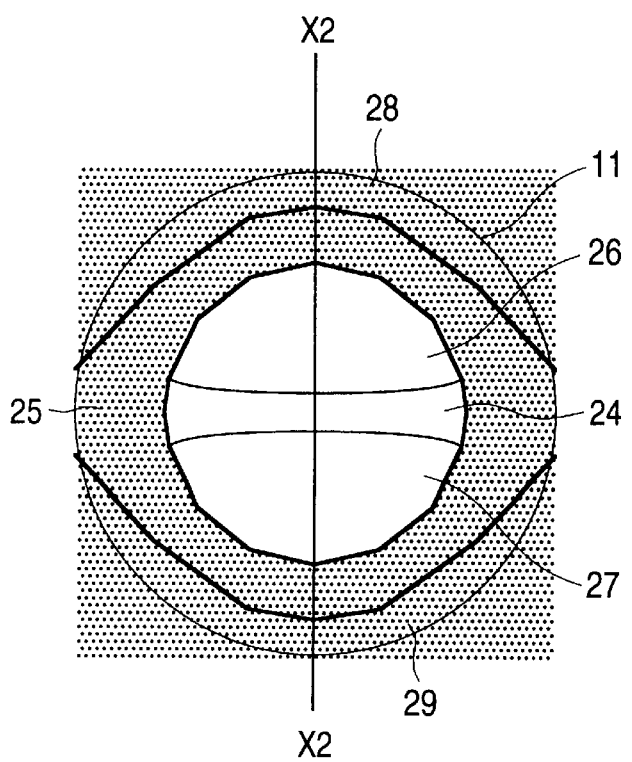

FIGS. 14A and 14B show the states of application of voltage to the respective areas of the transparent electrode 302*d* of the liquid crystal panel 21 whose voltage is controlled by the liquid-crystal-panel controlling circuit 10 during the reading of the recorded information of the DVD and the reading of the recorded information of the CD in the optical pickup in accordance with the third embodiment using the liquid crystal panel 21. Specifically, FIG. 14A shows the state of application of voltage to the transparent electrode 302*d* in the case where tilt correction control is effected during the reading of the recorded information of the DVD, while FIG. 14B shows the state of application of voltage to the transparent electrode 302*d* during the reading of the recorded information of the CD.

It should be noted, in FIGS. 14A and 14B, those areas to which the same voltage is applied are visually classified by representing the respective areas by the same patterns.

Accordingly, as shown in FIG. 14A, in the case where tilt correction control is effected during the reading of the recorded information of the DVD, with respect to the areas 24 and 25, the liquid-crystal-panel controlling circuit 10 maintains the state of orientation of the liquid crystal molecules M by the predetermined voltage applied in the state in which the DVD is not tilted in the radial direction as described above. With respect to the areas 26 and 29, the liquid-crystal-panel controlling circuit 10 applies a substantially identical voltage corresponding to the tilt of the DVD. With respect to the areas 27 and 28, the liquid-crystal-panel controlling circuit 10 applies a substantially identical voltage equal in magnitude and opposite in polarity to the voltage applied to the areas 26 and 29.

In addition, the voltage to be applied to the areas 26 and 29 by the liquid-crystal-panel controlling circuit 10 is set for each of the areas 26 to 29 such that the distribution of the residual wavefront aberration of the light spot which is formed due to the tilt of the DVD assumes a residual distribution at a value within a predetermined range. The liquid crystal molecules M corresponding to the respective areas are oriented in correspondence with the respective voltages applied thereto.

Next, a description will be given of control operation effected by the liquid-crystal-panel controlling circuit 10 in a case where a changeover is effected from the reading of the recorded information of the DVD to the reading of the recorded information of the CD in the third embodiment.

When the optical pickup reads the recorded information of the CD, a CD selection signal is imparted to the liquid-crystal-panel controlling circuit 10. When this CD selection signal is imparted, the liquid-crystal-panel controlling circuit 10 effects control by changing the voltage to an appropriate voltage for each of the areas 24 to 29 provided in the transparent electrode 302*d* of the liquid crystal panel 21.

Specifically, as shown in FIG. 14B, with respect to the areas 24, 26, and 27, the liquid-crystal-panel controlling circuit 10 maintains the state of orientation of the liquid crystal molecules M by the predetermined voltage applied in the state in which the DVD is not tilted in the radial direction during the reading of the recorded information of the DVD as described above. When control is effected such that the liquid crystal molecules M assume a substantially perpendicularly oriented state by its electric field, the portion of the liquid crystal panel 21 at the areas 24, 26, and 27 becomes a mere transparent plate due to the action similar to the one described before.

Accordingly, in the same way as in the case of the above-described reading of the recorded information of the DVD, all the reflected light passing through these areas 24, 26, and 27 is reflected in the horizontal direction by the polarization beam splitter 2, and is received by the light receiving device 8.

In addition, at the same time as the above-described control operation of the areas 24, 26, and 27, the liquid-crystal-panel controlling circuit 10 effects control such that the voltage applied to the areas 25, 28, and 29 becomes 0 (ground potential), so that no electric field acts on the liquid crystal molecules M of the liquid crystal 304 corresponding to the areas 25, 28, and 29.

Accordingly, the liquid crystal molecules M of the liquid crystal 304 corresponding to the areas 25, 28, and 29 remain in the twist-oriented state. Hence, the reflected light passing through the areas 25, 28, and 29 has its plane of polarization rotated along the twisted liquid crystal molecules M, and is made incident upon the quarter-wave plate 4.

As for the laser beam incident upon the quarter-wave plate 4, since its plane of orientation is oriented in a substantially similar direction as that of the crystal axis of the quarter-wave plate 4, that laser beam passes through the quarter-wave plate 4 without being substantially affected by the effect of the quarter-wave plate 4, and after it is reflected by the information recording surface of the CD, that laser beam is made incident upon the quarter-wave plate 4.

The reflected light incident upon the quarter-wave plate 4 passes again through the quarter-wave plate 4 as it is in the form of the linearly polarized light without being substantially affected by the effect of the quarter-wave plate 4, and is made incident upon the liquid crystal panel 21. This reflected light constituted by the linearly polarized light, when passing through the liquid crystal panel 21, has its plane of polarization rotated along the twist of the liquid crystal molecules M. When this reflected light emerges from the liquid crystal panel 21, its direction of polarization becomes substantially similar to that of the original plane of polarization of the laser beam.

Accordingly, since the laser beam reflected by the CD after passing through the areas 25, 28, and 29 of the liquid crystal panel 21 is transmitted as it is through the polarization beam splitter 2, that laser beam is not made incident upon the light receiving device 8.

Thus, when the recorded information of the CD is read, only the portion of the areas 24, 26, and 27 of the transparent electrode 302d of the liquid crystal panel 21 is made to act as the transparent plate, only the reflected light which passed through this circular pattern portion can be transmitted to the light receiving device 8.

This is equivalent to the fact that, of the laser beam passing through the objective lens 5, the portion of the laser beam passing through the outer peripheral portion of the lens where the aberration is large is cut off. Accordingly, if the configuration of the area formed by the areas 24, 26, and 27 is set such that the numerical aperture NA at this time is equivalently set to a value suitable for the reading of the recorded information of the CD, e.g., NA=0.37 (in the case where the wavelength of the laser is 650 nm), then the CD can be reproduced properly by using the same optical pickup used for the DVD.

Figure 15:
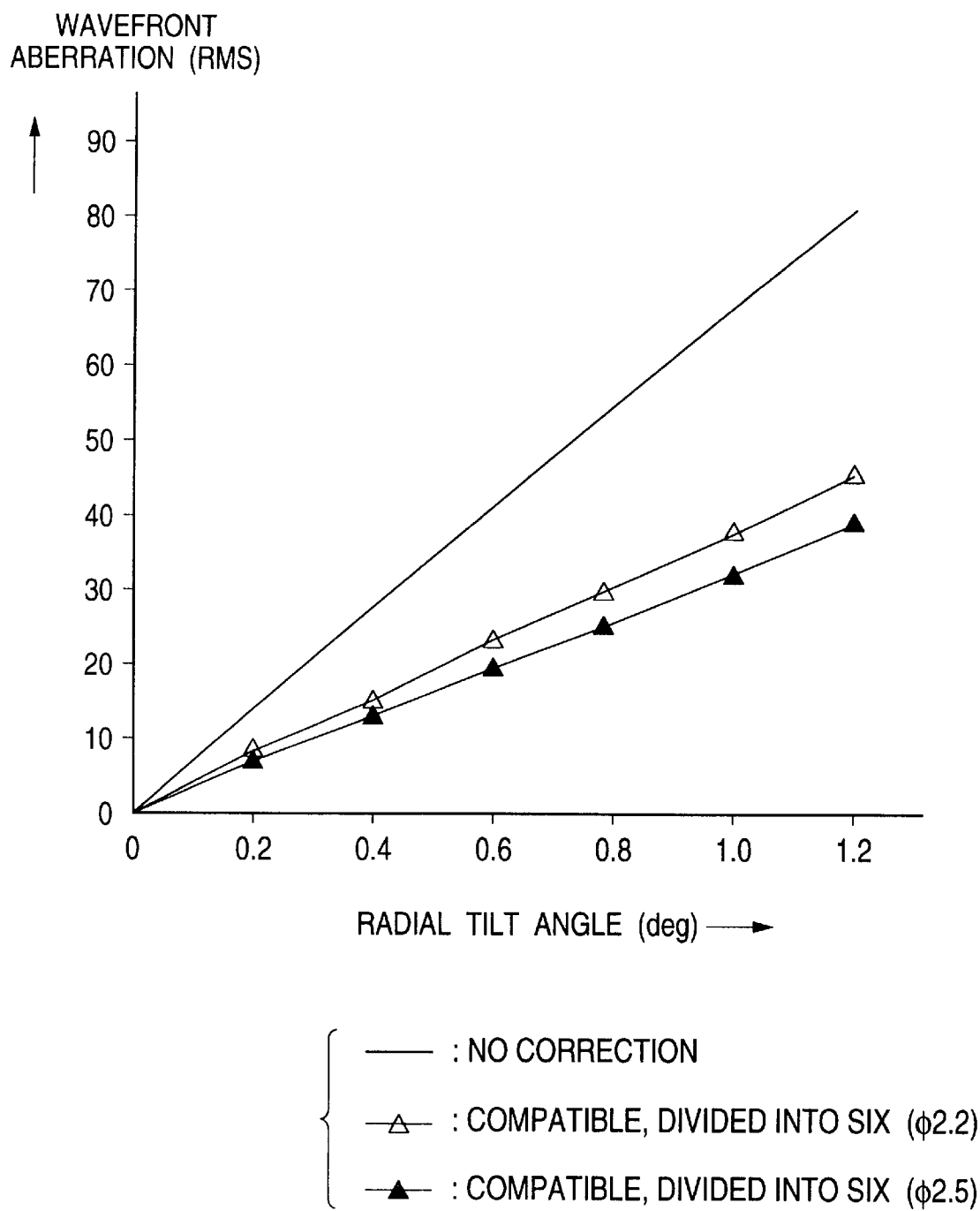
FIG. 15 is a graphic showing the simulated results of the wavefront aberration of a light spot, which is formed on the recording surface of the DVD by the optical pickup in accordance with the third embodiment of the present invention, for each tilt angle (in the radial direction) of the disk.

FIG. 15 is a graphic representation of the results of simulation of the wavefront aberration of a light spot, which is formed on the recording surface of the DVD by the optical pickup using the liquid crystal panel 21 arranged as described above, for each tilt angle (in the radial direction) of the disk. The result of simulation of a case where the transparent electrode 302d is formed in a six-divided pattern and the circular region formed by areas 24, 26, and 27 is set to circular ranges respectively having diameters of 2.2 mm and 2.5 mm is shown in comparison with the result of simulation of the wavefront aberration in a case where the transparent electrode 302d is not divided (no correction).

Here, an optimum diameter of the circular region for reading the CD is 2.2 mm, and an optimum NA is obtained for the CD in this setting. In addition, the diameter of a central portion of the electrode to which voltage is applied for correcting the wavefront aberration ascribable to the tilt angle of the optical disk, i.e., the diameter of a circle including the regions 16 and 18 in FIG. 11D, for example, is approximately 3.0 mm.

From this fact, from the viewpoint of reproduction of the CD, 2.2 mm is optimally suited as the circular region formed by the areas 24, 26, and 27 in FIG. 13B; however, from the viewpoint of correction of the tilt angle in the reproduction of the DVD, 3.0 is optimally suited. As can be appreciated from FIG. 15, in both cases where the set range of the circular region formed by the areas 24, 26, and 27 is set to the circular ranges of 2.2 mm and 2.5 mm in diameter, the wavefront aberration is reduced with respect to the tilt (in the radial direction) of the disk. Even if the divided pattern shown in FIG. 13B is used, sufficient correction can be provided with respect to the tilt angle.

In addition, although a greater diameter of the circular region is advantageous in the correction of the tilt angle during the DVD reproduction, if the diameter is made excessively large, it is disadvantageous during reproduction of the CD, but if the diameter of the circular region is 2.5 mm or thereabouts, no particular problem is presented during reproduction of the CD.

As described above, in the third embodiment, since the transparent electrode 302d of the liquid crystal panel 21 is formed by a pattern which integrates a divided pattern for tilt correction and a divided pattern for changeover between the DVD and the CD, the liquid-crystal-panel controlling circuit 10 can provide control easily since it is capable of effecting tilt correction and changeover between the DVD and the CD by controlling the changeover of a single electrode pattern.

[Advantages of the Invention]

Since the present invention is configured as described above, the electrode provided in the wavefront-aberration correcting device is divided into a configuration corresponding to the distribution of wavefront aberration ascribable to the tilt angle of the optical disk. Accordingly, even if the optical disk is tilted during the reproduction of the optical disk, the wavefront-aberration correcting device corrects the light spot formed on the recording surface of the optical disk in such a manner as to suppress the value of wavefront aberration ascribable to the tilt of the optical disk within a predetermined range, so that reproduction can be effected satisfactorily.

In addition, in the present invention, one of a pair of electrodes of the wavefront-aberration correcting device is divided into a configuration corresponding to the distribution of wavefront aberration ascribable to the tilt angle of the optical disk, and the other one of the pair of electrodes is divided into a configuration for correcting wavefront aberration ascribable to the thickness of the substrate of the optical disk to be reproduced. Accordingly, the wavefront-aberration correcting device corrects the light spot formed on the recording surface of the optical disk in such a manner as to suppress the value of wavefront aberration ascribable to the tilt of the optical disk within a predetermined range and the value of wavefront aberration ascribable to the thickness of the substrate of the optical disk to be reproduced within a predetermined range, so that optical disks whose substrates have different thicknesses can be reproduced satisfactorily, respectively.

In addition, in the present invention, one of a pair of electrodes of the wavefront-aberration correcting device is formed by being divided into a configuration corresponding to the distribution of wavefront aberration ascribable to the tilt angle of the optical disk and into a configuration for correcting wavefront aberration ascribable to the thickness of the substrate of the optical disk to be reproduced. Accordingly, by controlling one electrode the wavefront-aberration correcting device corrects the light spot formed on the recording surface of the optical disk in such a manner as to suppress the value of wavefront aberration ascribable to the tilt of the optical disk within a predetermined range and the value of wavefront aberration ascribable to the thickness of the substrate of the optical disk to be reproduced within a predetermined range, so that optical disks whose substrates have different thicknesses can be reproduced satisfactorily, respectively.

What is claimed is:

1. An optical pickup comprising:
    a laser light source emitting a laser beam;
    an objective lens collecting the laser beam; and
    a wavefront-aberration correcting device provided on an optical axis of the laser beam and adapted to change a refractive index by controlling voltage,
    wherein said wavefront-aberration correcting device has an electrode, and said electrode is divided into a configuration corresponding to a distribution of wavefront aberration ascribable to a tilt angle of an optical disk.

2. The optical pickup according to claim 1, wherein the divided configuration of said electrode is divided into a configuration corresponding to the distribution of the wavefront aberration in which the wavefront aberration ascribable to the tilt angle of said optical disk is viewed at a pupil plane of said objective lens.

3. The optical pickup according to claim 1, wherein voltage corresponding to the tilt angle of said optical disk is applied to said electrode for each divided area, so that the refractive index is changed for said each divided area and a phase difference is imparted to a transmitting light flux.

4. The optical pickup according to claim 1, wherein said wavefront-aberration correcting device is formed by a liquid crystal device.

5. An optical pickup comprising:

a laser light source emitting a laser beam;

an objective lens collecting the laser beam; and a wavefront-aberration correcting device provided on an optical axis of the laser beam and adapted to change a refractive index by controlling voltage, wherein said wavefront-aberration correcting device has a pair of electrodes, one of said electrodes is a first electrode divided into a configuration corresponding to a distribution of wavefront aberration ascribable to a tilt angle of an optical disk, and the other of said electrodes is a second electrode divided into a configuration for correcting wavefront aberration ascribable to the thickness of a substrate of said optical disk to be reproduced.

6. The optical pickup according to claim 5, wherein a divided configuration of said second electrode is an aperture pattern of a predetermined configuration acting as a mechanism for shielding a transmitting light flux.

7. An optical pickup comprising:

a laser light source emitting a laser beam;

an objective lens collecting the laser beam; and a wavefront-aberration correcting device provided on an optical axis of the laser beam and adapted to change a refractive index by controlling voltage, wherein said wavefront-aberration correcting device has an electrode, and said electrode is divided into a configuration corresponding to a distribution of wavefront aberration ascribable to a tilt angle of an optical disk and into a configuration for correcting wavefront aberration ascribable to the thickness of a substrate of said optical disk.

8. The optical pickup according to claim 7, wherein said wavefront-aberration correcting device functions to correct the wavefront aberration ascribable to the tilt angle during reproduction of an optical disk of high-density recording, while said wavefront-aberration correcting device functions as a mechanism for shielding a transmitting light flux during reproduction of an optical disk of low-density recording.

* * * * *